United States Patent [19]

Kopp et al.

[11] Patent Number: 4,587,275
[45] Date of Patent: May 6, 1986

[54] PROCESS FOR THE PREPARATION OF POLYURETHANE ELASTOMERS

[75] Inventors: Richard Kopp, Cologne; Holger Meyborg, Odenthal; Gerhard Grögler, Leverkusen; Jürgen Schwindt, Leverkusen, all of Fed. Rep. of Germany

[73] Assignee: Bayer Aktiengesellschaft, Leverkusen, Fed. Rep. of Germany

[21] Appl. No.: 429,707

[22] Filed: Sep. 30, 1982

Related U.S. Application Data

[63] Continuation of Ser. No. 243,011, Mar. 12, 1981, abandoned.

[30] Foreign Application Priority Data

Apr. 2, 1980 [DE] Fed. Rep. of Germany ....... 3012864

[51] Int. Cl.$^4$ ............................................. C08G 18/14
[52] U.S. Cl. ..................... 521/163; 528/44; 528/62; 528/63; 528/64; 528/76; 528/80; 528/84
[58] Field of Search .................... 521/163; 528/44, 62, 528/63, 64, 76, 80, 84

[56] References Cited

U.S. PATENT DOCUMENTS 3,004,939 10/1961 Varvaro .............................. 260/22
3,401,151 9/1968 Wieden et al. ......................... 260/75
3,891,606 6/1975 Kogon ........................ 260/77.5 AM
3,926,922 12/1975 Baron et al. ................ 260/77.5 AM

FOREIGN PATENT DOCUMENTS 671062 10/1965 Belgium .
0017905 4/1980 European Pat. Off. .
2635400 2/1978 Fed. Rep. of Germany .
919570 4/1970 Japan .

Primary Examiner—Maurice J. Welsh
Attorney, Agent, or Firm—Gene Harsh; Joseph C. Gil; Lyndanne M. Whalen

[57] ABSTRACT

Polyurethane urea elastomers are produced by reacting polyisocyanates with compounds containing at least two isocyanate reactive hydrogen atoms having a molecular weight of 400 to 10,000 and mononuclear or dinuclear aromatic diamines. The aromatic diamines must have at least one sulfonamide group as a substituent on at least one of their aromatic rings. Known chain lengthening agents, activators, blowing agents, auxiliary agents and additives may also be included in the reaction mixture.

Polyurethane elastomers produced by this process have excellent mechanical properties. In particular, such elastomers are soft yet have high tear propagation resistance.

13 Claims, No Drawings

PROCESS FOR THE PREPARATION OF POLYURETHANE ELASTOMERS

This application is a continuation of application Ser. No. 243,011 filed Mar. 12, 1981 now abandoned.

BACKGROUND OF THE INVENTION

This invention relates to a process for the preparation of polyurethane urea elastomers. More specifically it relates to such a process in which an aromatic diamine containing sulfonic acid amide group is used as a chain lengthening agent.

The production of polyurethane urea elastomers from polyisocyanates, relatively high molecular weight polyhydroxyl compounds and aromatic diamines is known. In order to achieve acceptable processing times, the commonly used reactive aromatic isocyanates are reacted with diamines which are relatively inert. Suitable diamines are those aromatic diamines in which the basicity (and hence also the isocyanate reactivity) has been reduced by the introduction of halogen or carboxyl substituents. The most commonly used diamines are 3,3'-dichloro-4,4'-diaminodiphenylmethane (MOCA) and 4-chloro-3,5-diaminobenzoic acid isobutylester.

In U.S. Pat. No. 3,891,606 one such method for producing polyurethane urea elastomers is described. In this patented process, an isocyanate prepolymer is made from polyhydroxyl compounds and an excess of polyisocyanates. This prepolymer is cross-linked with aromatic diamines having reduced reactivity with respect to isocyanate groups. The diamine reactivity is reduced by formation of a complex with certain alkali metal salts. This method is disadvantageous in that it is restricted to two special aromatic diamines and that it requires a separate process for the preparation of aromatic diamine and alkali metal salt complex.

Another method for controlling the velocity of the reaction between polyisocyanates and aromatic diamines utilizes an organic solvent as the reaction medium. Processes of this type have been described in U.S. Pat. No. 3,926,922 and published Japanese Patent Application No. 9195/70. The disadvantages of such processes include increased risk of fire and explosion and requirement of an expensive technological process for recovering the expensive and ecologically undesirable solvent.

German Auslegeschrift No. 1,122,699 discloses a process for the preparation of polyurethane elastomers in which liquid isocyanate prepolymers are cross-linked with mixtures of primary diamines and compounds having several hydroxyl groups. In this process, a pulverulent crystalline diamine is dispersed in a liquid polyether or polyester containing several hydroxyl groups or in castor oil. This diamine dispersion is introduced into the isocyanate prepolymer at a temperature below the melting point of the diamine. The reaction product is then cured at temperatures above the melting point of the diamine.

German Offenlegungsschrift No. 2,635,400 describes a process in which a finely ground diamine is suspended in a polyhydroxyl compound. The suspended diamine is then reacted with a polyisocyanate or a prepolymer containing isocyanate groups at a temperature below the melting point of the diamine. In this process, the aromatic diamine may also be stirred directly (in the form of a dry powder) into a prepolymer containing isocyanate groups. The reaction mixtures which have a long pot life are cured to produce polyurethane urea elastomers. Curing is preferably carried out at temperatures of from 80° to 120° C. and most preferably at 100° to 110° C. The curing temperature must, however, be below the melting point of the aromatic diamine.

Although those processes in which the diamines used as chain lengthening agents are reacted in a heterogeneous phase do have longer processing times, they also have serious toxicological disadvantages.

SUMMARY OF THE INVENTION

It is an object of the present invention to provide a process for making a polyurethane urea elastomer in which the rate of reaction is reduced so that a relatively long processing time is achieved.

It is also an object of the present invention to provide a process for making a polyurethane urea elastomer in which the cross-linking agent employed is physiologically harmless.

It is a further object of the present invention to provide a process for making a polyurethane urea elastomer having excellent mechanical properties (particularly softness combined with high tear propagation resistance).

These and other objects which will be apparent to those in the art are accomplished by a process in which a polyisocyanate and a compound containing at least two isocyanate reactive hydrogen atoms are reacted in the presence of a chain lengthening agent. The chain lengthening agent is a mononuclear or dinuclear aromatic diamine having at least one sulfonamide group as a substituent on at least one aromatic ring.

DETAILED DESCRIPTION OF THE INVENTION

The present invention relates to a process for the production of a polyurethane urea elastomer by the reaction of a polyisocyanate (preferably a diisocyanate) a compound containing at least two isocyanate reactive hydrogen atoms and having a molecular weight of from 400 to 10,000 (preferably a polyhydroxyl compound) and a mononuclear or dinuclear aromatic diamine as the chain lengthening agent. The diamine used has at least one sulfonamide group as a substituent on at least one aromatic ring, preferably in the m- and/or p-position to one of the amino groups. Compounds corresponding to the following general formula

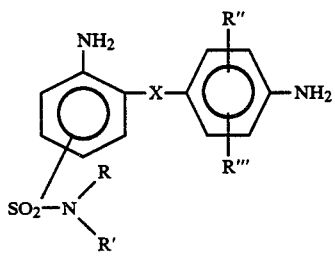

in which
X represents

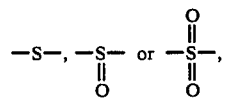

R and R' which may be the same or different, represent straight or branched chain aliphatic groups having from 1 to 4 carbon atoms and R" and R'" which may be the same or different represent hydrogen, an alkyl group or an alkoxy or an alkylmercapto group having from 1 to 4 carbon atoms are not, however, within the class of suitable diamines.

Other isocyanate reactive compounds having a molecular weight of from 32 to 400 may also be used as additional chain lengthening agents. Activators, blowing agents and/or other known auxiliary agents and additives may also be included in the reaction mixture.

The diamines which are preferred in the practice of the present invention are those corresponding to the general formulae:

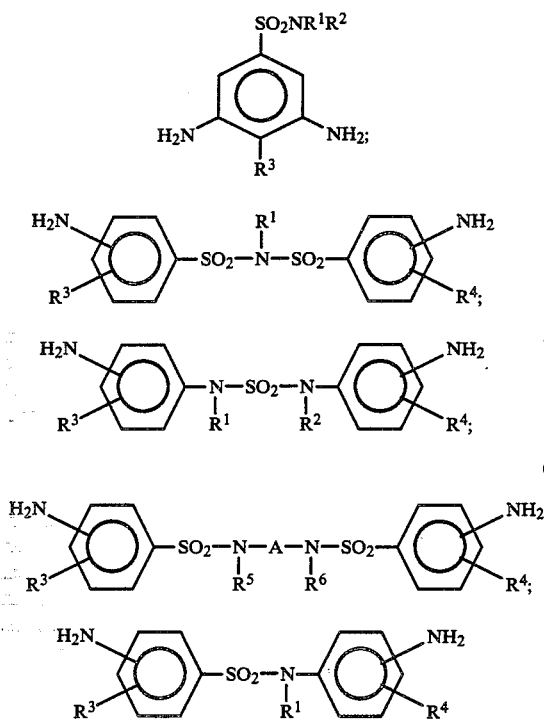

In formulae I through V, the variable substituents are as follows:

$R^1$ and $R^2$ (which may be the same or different) represent hydrogen, a straight or branched chain alkyl group having from 1 to 20 carbon atoms ($R^2$ preferably 1 to 6 carbon atoms), or an aryl or aralkyl group having from 6 to 20 carbon atoms; and $R^3$ and $R^4$ (which may be the same or different) represent hydrogen, a straight or branched chain alkyl group having from 1 to 6 carbon atoms (preferably methyl), an alkoxy group having from 1 to 6 carbon atoms or halogen (preferably chlorine);

$R^5$ and $R^6$ have the same meaning as $R^1$ and $R^2$ or together represent an alkylene bridge with 1 to 6 carbon atoms which may be straight or branched chain and/or contain hetero atoms, preferably an ethylene group; and A is an alkylene bridge having from 2 to 6 carbon atoms which may be straight or branched chain and/or contain hetero atoms.

Particularly preferred are those compounds corresponding to the general formulae (I) and (V) in which the sulfonamide group is in the position meta and/or para to the amino group.

The aromatic diamines containing sulfonamide groups may be prepared by methods known to those in the art. Diamines corresponding to the general formula (I), for example, may be obtained by first converting a corresponding dinitrobenzene sulfonic acid or a salt thereof corresponding to the formula

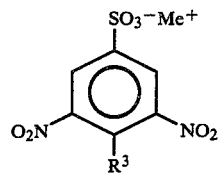

($Me^+$ =metal cation) into the sulfonic acid halide. The sulfonic acid halide is then reacted with a secondary amine corresponding to the formula

or its hydrochloride. The nitro groups are then hydrogenated by techniques known to those in the art.

Compounds of formula (II) may be obtained by reacting the corresponding nitrobenzene sulfochloride with a primary amine in the presence of sodamide, followed by hydrogenation of the nitro groups to amino groups.

Diamines of formula (III) may be obtained by reacting sulfonyl chloride with the corresponding nitroaniline and then hydrogenating the nitro groups to amino groups in known manner.

Diamines of formula (IV) may be obtained by reacting the corresponding nitrobenzene sulfochloride with a diamine such as N,N'-dialkylethylenediamine or piperidine. This reaction is followed by catalytic hydrogenation of the nitro groups to amino groups.

Diamines of formula (V) may be obtained by reaction of the corresponding nitrobenzene sulfochloride with a nitroaniline followed by catalytic hydrogenation of the nitro groups to the amino groups.

Compounds with isocyanate reactive hydrogen atoms (hydroxyl and/or amino and/or thiol and/or carboxyl groups) suitable for the process of the present invention have a molecular weight of approximately 400 to 10,000 (preferably 600 to 6000). Such compounds are preferably polyesters, polyethers, polythioethers, polyacetals, polycarbonates or polyester amides having at least two (preferably two to four) hydroxyl groups. Hydroxyl compounds used in known processes for the production of both homogeneous and cellular polyurethanes are particularly preferred.

Suitable hydroxyl polyesters include the reaction products of polyhydric (preferably dihydric alcohols to which trihydric alcohols may be added) and polybasic (preferably dibasic) carboxylic acids. The polycarboxylic acids may be aliphatic, cycloaliphatic, aromatic and/or heterocyclic and they may be substituted (e.g. by halogen atoms) and/or unsaturated. In addition to free polycarboxylic acids, the corresponding polycarboxylic acid anhydrides or polycarboxylic acid esters of lower alcohols or mixtures thereof may also be used in preparing the hydroxyl polyester.

Examples of suitable carboxylic acids and their derivatives are: Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids which may be mixed with monomeric fatty acids such as oleic acid; dimethyl terephthalate and terephthalic acid-bis-glycol esters.

Examples of polyhydric alcohols which may be used in making hydroxyl polyesters are: Ethylene glycol; (1,2)- and (1,3)-propylene glycol; (1,4)- and (2,3)-butylene glycol; (1,6)-hexanediol; (1,8)-octanediol; neopentylglycol; 1,4-bis-hydroxymethylcyclohexane; 2-methyl-1,3-propanediol; glycerol; trimethylolpropane; (1,2,6)-hexanetriol; (1,2,4)-butanetriol; trimethylolethane; pentaerythritol; quinitol; mannitol and sorbitol; formitol; methylglycoside; diethylene glycol; triethylene glycol; tetra-ethylene glycol and higher polyethylene glycols; dipropylene glycol and higher polypropylene glycols; and dibutylene glycol and higher polybutylene glycols.

The polyesters may also contain a proportion of carboxyl end groups. Polyesters of lactone such as ε-caprolactone or of hydroxycarboxylic acids such as ω-hydroxycaproic acid may also be used.

The polyethers which may be used in the present invention have at least 2, generally 2 to 8 and preferably 2 to 3 hydroxyl groups and are known to those in the art. Such polyethers may be prepared by polymerization of epoxides such as ethylene oxide; propylene oxide; butylene oxide; tetrahydrofuran; styrene oxide or epichlorohydrin. A single epoxide may be polymerized in the presence of a Lewis catalyst such as boron trifluoride. Several epoxides preferably ethylene oxide and propylene oxide may be polymerized either as mixtures or successively by addition of these epoxides to compounds having reactive hydrogen atoms. Suitable compounds containing reactive hydrogen include water, alcohols, ammonia and amines, such as ethylene glycol; (1,2)- or (1,3)-propylene glycol; trimethylol propane; glycerol; sorbitol; 4,4'-dihydroxydiphenylpropane; aniline; ethanolamine or ethylene diamine. Sucrose polyethers may also be used in the present invention. Suitable sucrose polyethers are described in German Auslegeschriften No. 1,176,358 and No. 1,064,938. Polyethers started on formitol or formose are disclosed in German Offenlegungschriften Nos. 2,639,083 and 2,737,951. It is generally preferred to use polyethers which contain predominantly primary hydroxyl groups (up to 90% by weight, based on all the hydroxyl groups present in the polyether). Polybutadienes which have hydroxyl groups are also suitable according to the invention.

Among the polythioethers which may be used in the present invention are the condensation products obtained by reacting thiodiglycol and/or other glycols, with dicarboxylic acids, formaldehyde, aminocarboxylic acids or amino alcohols. The products obtained are mixed polythio ethers, polythio ether esters or polythio ether ester amides, depending upon the specific reactants.

Suitable polyacetals for the practice of the present invention include those prepared from glycols such as diethylene glycol, triethylene glycol, 4,4'-dioxethoxydiphenyl dimethylmethane, hexanediol and formaldehyde by methods known to those in the art. Suitable polyacetals may also be prepared by the polymerization of cyclic acetals (e.g. trioxane) in accordance with a procedure such as that described in German Offenlegungsschrift No. 1,694,128.

The polycarbonates with hydroxyl groups which may be used in the present invention include those known in the art, such as those prepared by the reaction of diols (such as propanediol-(1,3), butanediol-(1,4) and/or hexanediol-(1,6), diethylene glycol, triethylene glycol, tetraethylene glycol or thiodiglycol) with diarylcarbonates (e.g. with diphenylcarbonate or phosgene). Such processes are described in German Auslegeschriften Nos. 1,694,080; 1,915,908 and 2,221,751 and German Offenlegungsschrift No. 2,605,024.

Suitable polyester amides and polyamides include the predominantly linear condensates prepared from polybasic saturated and unsaturated carboxylic acids or their anhydrides and polyvalent saturated and unsaturated amino alcohols, diamines, polyamines and mixtures thereof.

Polyhydroxyl compounds containing urethane or urea groups and modified or unmodified natural polyols such as castor oil, carbohydrates or starch may also be used as the compound containing isocyanate reactive hydrogen atoms, and a molecular weight of 400 to 10,000. Addition products of alkylene oxides and phenol formaldehyde resins or of alkylene oxides and urea formaldehyde resins are also suitable for the purpose of the invention.

The polyhydroxyl compounds mentioned above may be modified in various ways before they are used in the polyisocyanate polyaddition process. According to German Offenlegungsschriften Nos. 2,210,839 (U.S. Pat. No. 3,849,515) and 2,544,195, a mixture of various polyhydroxyl compounds (e.g. of a polyether polyol and a polyester polyol) may be condensed by etherification in the presence of a strong acid to form a relatively high molecular weight polyol built up of various segments linked by ether bridges. Amide groups may be introduced into the polyhydroxyl compounds in accordance with the process disclosed in German Offenlegungsschrift No. 2,559,372. German Offenlegungsschrift No. 2,620,487 teaches a process in which triazine groups may be introduced into a polyhydroxyl compound by a reaction with polyfunctional cyanic acid esters. Polyhydroxyl compounds containing guanidine, phosphonoformamidine or acylurea groups may be prepared by first reacting a polyol with less than its equivalent amount of a diisocyanatocarbodiimide and then reacting the carbodiimide group with an amine, amide, phosphite or a carboxylic acid (See, German Offenlegungsschriften Nos. 2,714,289; 2,714,292 and 2,714,293). In some cases it is desirable to convert the relatively high molecular weight polyhydroxyl compound (either partially or completely) into the corresponding anthranilic acid ester by reaction with isatoic acid anhydride, as described in German Offenlegungsschriften Nos. 2,019,432 and 2,619,840 and in U.S. Pat. Nos. 3,808,250; 3,975,428 and 4,016,143. Such procedures produce relatively high molecular weight compounds having aromatic amino end groups.

Relatively high molecular weight compounds having amino end groups may be obtained (according to German Offenlegungsschrift No. 2,546,536 or U.S. Pat. No. 3,865,791) by the reaction of isocyanate prepolymers with hydroxyl group-containing enamines, aldimines or ketimines, followed by hydrolysis. Other methods for preparing relatively high molecular weight compounds having amino end groups or hydrazide end groups are described in German Offenlegungsschrift No. 1,694,152 (U.S. Pat. No. 3,625,871).

Polyhydroxyl compounds containing high molecular weight polyadducts or polycondensates or polymers in a finely dispersed or dissolved form may also be employed in the present invention. Such polyhydroxyl compounds may be obtained by carrying out polyaddition reactions (for example reactions between polyisocyanates and aminofunctional compounds) or polycondensation reactions (for example between formaldehyde and phenols and/or amines) in situ in the above-mentioned hydroxyl-containing compounds. Processes of this type have been described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. According to U.S. Pat. No. 3,869,413 and German Offenlegungsschrift No. 2,550,860, such polyhydroxyl compounds may also be prepared by mixing a previously prepared aqueous polymer dispersion with a polyhydroxyl compound and subsequently removing water from the mixture.

Polyhydroxyl compounds modified by vinyl polymers, such as the compounds obtained by the polymerization of styrene and acrylonitrile in the presence of polyethers (U.S. Pat. Nos. 3,383,351; 3,304,273; 3,523,093 and 3,110,695 and German Ausleegeschrift No. 1,152,536) or polycarbonate polyols (German Pat. No. 1,769,795 and U.S. Pat. No. 3,637,909) are also suitable compounds containing at least two isocyanate reactive hydrogen atoms (M wt. of 400–10,000). Polyurethanes of exceptionally high flame resistance may be obtained by using polyether polyols which have been modified by graft polymerization with vinyl phosphonic acid esters and optionally (meth)-acrylonitrile, (meth)-acrylamide or OH functional (meth)-acrylic acid esters (see German Offenlegungsschriften Nos. 2,442,101; 2,644,922 and 2,646,141).

Polyhydroxyl compounds into which carboxyl groups have been introduced by radical graft polymerization with unsaturated carboxylic acids and optionally other olefinically unsaturated monomers (German Offenlegungsschriften Nos. 2,714,291; 2,739,620 and 2,654,746) are exceptionally advantageous in the present invention when used in combination with mineral fillers. When such modified polyhydroxyl compounds are used as a starting material in the polyisocyanate polyaddition process, polyurethanes with substantially improved mechanical properties are generally obtained.

Representative of the various compounds containing at least two isocyanate reactive hydrogen atoms (M wt. of 400–10,000) suitable to the present invention described above may be found in High Polymers, Vol. XVI, "Polyurethanes, Chemistry and Technology", by Saunders-Frisch, Interscience Publishers, New York, London, Vol. I, 1962, pages 32 to 42 and pages 44 to 54 and Vol. II, 1964, pages 5 to 6 and 198 to 199, and in Kunststoff-Handbuch, Vol. VII, Vieweg-Hochtlen, Carl-Hanser-Verlag, Munich, 1966, e.g. on pages 45 to 71.

Mixtures of any of the above-mentioned compounds containing at least two isocyanate reactive hydrogen atoms and having a molecular weight of from 400 to 10,000 (e.g. mixtures of polyethers and polyesters) may, also be used in the process of the present invention. In some cases it may be particularly advantageous to combine low melting with high melting polyhydroxyl compounds (see German Offenlegungsschrift No. 2,706,297).

Compounds having at least two isocyanate reactive groups and a molecular weight of from 32 to 400 may also be used as starting components according to the present invention. Such low molecular weight compounds may be used in amounts which are up to 50 mol-% of the total amount of chain lengthening agents used (i.e., the sum of mononuclear or dinuclear aromatic diamines, and low molecular weight isocyanate reactive compounds). These compounds may contain hydroxyl groups and/or amino groups and/or thiol groups and/or carboxyl groups, preferably hydroxyl groups and/or amino groups. They generally have from 2 to 8, (preferably 2 to 4) isocyanate reactive hydrogen atoms and are used as chain lengthening agents or cross-linking agents. These compounds containing at least two isocyanate reactive hydrogen atoms and having a molecular weight of from 32 to 400 may be used individually or as mixtures of several compounds.

Examples of such low molecular weight isocyanate reactive compounds include: Ethylene glycol; (1,2)- and (1,3)-propylene glycol; (1,4)- and (2,3)-butylene glycol; (1,5)-pentanediol; (1,6)-hexanediol; (1,8)-octanediol; neopentyl glycol; 1,4-bis-hydroxymethyl-cyclohexane; 2-methyl-1,3-propanediol (U.S. Pat. No. 3,723,392); glycerol; trimethylol propane; (1,2,6)-hexanetriol; trimethylolethane; pentaerythritol; quinitol; mannitol and sorbitol; castor oil; diethylene glycol; triethylene glycol; tetraethylene glycol; higher polyethylene glycols with a molecular weight of up to 400; dipropylene glycol; higher polypropylene glycols with a molecular weight of up to 400; 4,4'-dihydroxy-diphenylpropane; dihydroxymethylhydroquinone; ethanol amine; diethanol amine; N-methyldiethanol amine; triethanol amine and 3-aminopropanol.

The low molecular weight polyols which may be used in the present invention also include mixtures of hydroxyaldehydes and hydroxyketones ("formose") and the polyhydric alcohols obtained from them by reduction ("formitols"), such as those produced by the auto-condensation of formaldehyde hydrate in the presence of metal compound catalysts and compounds capable of ene-diol formation as cocatalysts (German Offenlegungsschriften Nos. 2,639,084; 2,714,084; 2,714,104; 2,721,186; 2,738,154 and 2,738,512). When formose is used in combination with aminoplast formers and/or phosphites, polyurethanes having improved flame resistance are obtained (German Offenlegungsschriften Nos. 2,738,513 and 2,738,532). Solutions of polyisocyanate polyaddition products (such as polyhydrazodicarbonamides and/or polyurethane ureas containing ionic groups) in low molecular weight polyhydric alcohols may also be used as a polyol component in the present invention (German Offenlegungsschrift No. 2,638,759).

The low molecular weight polyols having molecular weights of up to 400 which may be used in the present invention also include ester diols corresponding to the general formulae

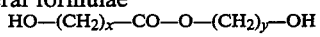

and

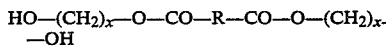

in which

R represents an alkylene group having from 1 to 10, (preferably from 2 to 6) carbon atoms or a cycloalkylene or arylene group having from 6 to 10 carbon atoms,
x=2 to 6 and
y=3 to 5.

Examples of such ester diols are 5-hydroxybutyl-ε-hydroxycaproic acid ester; Ω-hydroxyhexyl-γ-hydroxybutyric acid ester; adipic acid-bis-(β-hydroxyethyl)ester and terephthalic acid bis-(β-hydroxyethyl)ester.

Other low molecular weight polyols suitable to the present invention are diolurethanes corresponding to the general formula HO—(CH$_2$)$_x$—O—CO—NH—R'—NH—CO—O—(CH$_2$)$_x$—OH in which
R' represents an alkylene group having from 2 to 15, (preferably 2 to 6) carbon atoms or a cycloalkylene or arylene group having from 6 to 15 carbon atoms and
x represents a number from 2 to 6. Diolurethanes corresponding to the general formula include 1,6-hexamethylene-bis-(β-hydroxyethylurethane) and 4,4'-diphenylmethane-bis-(δ-hydroxybutylurethane). Diolureas corresponding to the general formula

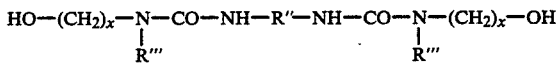

in which
R'' represents an alkylene group having from 2 to 15 (preferably 2 to 9) carbon atoms or a cycloalkylene or an arylene group having from 6 to 15 carbon atoms,
R''' represents hydrogen or a methyl group and
x is the number 2 or 3, may also be used in the present invention. 4,4'-diphenylmethane-bis-(β-hydroxyethylurea) and the compound

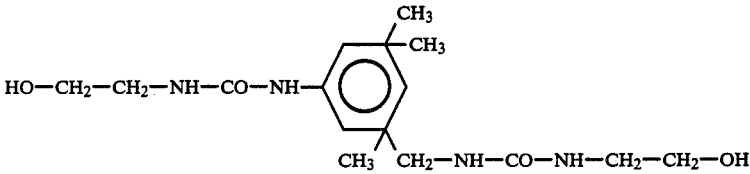

exemplify such diolureas.

For some purposes, it may be advantageous to use polyols which contain sulphonate and/or phosphonate groups (German Offenlegungsschrift No. 2,719,372) as an additional chain lengthening agent. The adduct of bisulphite and (1,4) butane diol and its alkoxylation products are among the preferred materials useful as such chain lengthening agents.

Diamines which may be used as a low molecular weight isocyanate reactive compound include ethylene diamine; 1,4-tetramethylene diamine; 1,11-undecamethylene diamine; 1,12-dodecamethylene diamine and mixtures thereof; 1-amino-3,3,5-trimethyl-5-aminomethylcyclohexane ("isophorone diamine"); 2,4- and 2,6-hexahydrotolylene diamine and mixtures thereof; perhydro-2,4'- and -4,4'-diaminodiphenylmethane; p-xylylene diamine; bis-(3-aminopropyl)-methylamine; diaminoperhydroanthracene (German Offenlegungsschrift No. 2,638,731) and cycloaliphatic triamines according to German Offenlegungsschrift No. 2,614,244. Hydrazine, substituted hydrazines (e.g. methyl hydrazine, N,N'-dimethylhydrazine and homologues thereof) and acid dihydrazides may also be used in the present invention. Examples of such compounds include: carbodihydrazide, oxalic acid dihydrazide, the dihydrazides of malonic acid, succinic acid, glutaric acid, adipic acid, β-methyladipic acid, sebacic acid, hydracrylic acid and terephthalic acid; semicarbazidoalkylene hydrazides, e.g. β-semicarbazidopropionic acid hydrazide (German Offenlegungsschrift No. 1,770,591); semicarbazidoalkylene carbazic esters such as 2-semicarbazidoethylcarbazic ester (German Offenlegungsschrift No. 1,918,504); and aminosemicarbazide compounds such as β-aminoethyl-semicarbazidocarbonate (German Offenlegungsschrift No. 1,902,931). The amino groups present in compounds such as those described above may be partially or completely blocked by aldimine or ketimine groups to control their reactivity (U.S. Pat. No. 3,734,894; German Offenlegungsschrift No. 2,637,115).

Examples of additional aromatic diamines useful in the present invention are: bis-anthranilic acid esters according to German Offenlegungsschriften Nos. 2,040,644 and 2,160,590; 3,5- and 2,4-diaminobenzoic acid esters according to German Offenlegungsschrift No. 2,025,900; the diamines containing ester groups mentioned in German Offenlegungsschriften Nos. 1,803,635 (U.S. Pat. No. 3,681,290 and and 3,736,350), 2,040,650 and 2,160,589; the diamines with ether groups according to German Offenlegungsschriften Nos. 1,770,525 and 1,809,172 (U.S. Pat. Nos. 3,654,364 and 3,736,295); 2-halogen-1,3-phenylenediamine which may be substituted in the 5-position (German Offenlegungsschriften Nos. 2,001,772; 2,025,896 and 2,065,860); 3,3'-dichloro-4,4'-diaminodiphenylmethane; tolylene diamine; 4,4'-diaminodiphenylmethane; 4,4'-diaminodiphenyldisulphide (German Offenlegungsschrift No. 2,404,976); diaminodiphenyldithioethers (German Offenlegungsschrift No. 2,509,404); aromatic diamines substituted by alkylthio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166) and the high melting diamines mentioned in German Offenlegungsschrift No. 2,635,400. The aminoalkylthioanilines according to German Offenlegungsschrift No. 2,734,574 exemplify suitable aliphatic-aromatic diamines.

The chain lengthening agents which may be optionally used in the present invention (i.e. low molecular weight isocyanate reactive compounds) also include compounds such as 1-mercapto-3-aminopropane; substituted or unsubstituted aminoacids, e.g. glycine, alanine, valine, serine and lysine; and substituted or unsubstituted dicarboxylic acids, e.g. succinic acid, adipic acid, phthalic acid, 4-hydroxyphthalic acid and 4-aminophthalic acid.

Compounds which are monofunctional in their reaction with isocyanates may also be used in proportions of from 0.01 to 10% by weight, based on the polyurethane solids content, to serve as "chain breakers". Examples of such monofunctional compounds include monoamines such as butylamine and dibutylamine, octylamine, stearylamine, N-methylstearylamine, pyrrolidine, piperidine and cyclohexylamine; monohydric alcohols such as butanol, 2-ethylhexanol, octanol and dodecanol, the various amyl alcohols, cyclohexanol and ethylene glycol monoethylether.

The polyisocyanates which may be used in the present invention include aliphatic, cycloaliphatic, araliphatic, aromatic and heterocyclic polyisocyanates. Examples of such compounds are given in W. Siefken's Justus Liebigs Annalen der Chemie, 562, pages 75 to 136. Among the polyisocyanates suitable to the present invention are those corresponding to the formula $$Q(NCO)_n$$

in which n=2–4 (preferably 2) and

Q represents an aliphatic hydrocarbon group having from 2 to 18 (preferably 6 to 10) carbon atoms; a cycloaliphatic hydrocarbon group having from 4 to 15 (preferably 5 to 10) carbon atoms; an aromatic hydrocarbon group having from 6 to 15 (preferably from 6 to 13) carbon atoms; or an araliphatic hydrocarbon group having from 8 to 15 (preferably from 8 to 13) carbon atoms.

Examples of such polyisocyanates are: ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethylcyclohexane (German Auslegeschrift No. 1,202,785; U.S. Pat. No. 3,401,190); 2,4- and 2,6-hexahydrotolylene diisocyanate and mixtures of these isomers; hexahydrophenylene-1,3-and/or 1,4-diisocyanate; perhydrodiphenylmethane-2,4'-and/or 4,4'-diisocyanate; phenylene-1,3- and -1,4-diisocyanate; tolylene-2,4- and -2,6-diisocyanate and mixtures of these isomers; diphenylmethane-2,4'- and/or 4,4'-diisocyanate; and naphthylene-1,5-diisocyanate.

The following are also suitable polyisocyanates for the present invention: Triphenylmethane-4,4',4"-triisocyanate; polyphenyl-polymethylene polyisocyanates (which are obtainable by aniline-formaldehyde condensation followed by phosgenation and have been described, for example, in British Pat. Nos. 874,430 and 848,671); m- and p-isocyanatophenylsulphonylisocyanates (U.S. Pat. No. 3,454,606); perchlorinated aryl polyisocyanates such as those described in German Auslegeschrift No. 1,157,601 (U.S. Pat. No. 3,277,138); polyisocyanates containing carbodiimide groups (German Pat. No. 1,092,007 (U.S. Pat. No. 3,152,162) and German Offenlegungsschriften Nos. 2,504,400; 2,537,685 and 2,552,350)); norbornane diisocyanates according to U.S. Pat. No. 3,492,330; polyisocyanates containing allophanate groups (British Pat. No. 994,890; Belgian Pat. No. 761,626 and Netherlands Patent Application No. 7,102,524); polyisocyanates containing isocyanurate groups (U.S. Pat. No. 3,001,973, German Pat. Nos. 1,022,789; 1,222,067 and 1,027,394 and in German Offenlegungsschriften Nos. 1,929,034 and 2,004,048); polyisocyanates containing urethane groups (Belgian Pat. No. 751,261, U.S. Pat. Nos. 3,394,164 and 3,644,457); polyisocyanates containing acylated urea groups (German Pat. No. 1,230,778); polyisocyanates containing biuret groups (U.S. Pat. No. 3,124,605; 3,201,372; 3,124,605 and British Pat. No. 889,050); polyisocyanates prepared by telomerization reactions (U.S. Pat. No. 3,654,106); polyisocyanates having ester groups (British Pat. Nos. 965,474 and 1,072,956; U.S. Pat. No. 3,567,763 and German Pat. No. 1,231,688); reaction products of the above-mentioned isocyanates with acetals (German Patent No. 1,072,385); and polyisocyanates containing polymeric fatty acid esters (U.S. Pat. No. 3,455,883).

The distillation residues containing isocyanate groups from the commercial production of isocyanates may also be used, optionally dissolved in one or more of the above-mentioned polyisocyanates. Any mixtures of the above-mentioned polyisocyanates may also be used.

It is generally preferred to use commercially readily available polyisocyanates, such as 2,4- and 2,6-tolylene diisocyanates and mixtures of these isomers ("TDI"); polyphenyl-polymethylene polyisocyanates obtainable by aniline-formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), particularly those modified polyisocyanates derived from 2,4- and/or 2,6-tolylene diisocyanate or from 4,4'- and/or 2,4'-diphenylmethane diisocyanate.

Auxiliary agents and additives which may be used in the process of the present invention include blowing agents, catalysts, emulsifiers, foam stabilizers and reaction retarders.

Suitable blowing agents are water and/or readily volatile inorganic or organic substances. Examples of suitable organic blowing agents include acetone; ethyl acetate; halogen substituted alkanes such as methylene chloride, chloroform, ethylidene chloride, vinylidene chloride, monofluorotrichloromethane, chlorodifluoromethane and dichlorodifluoromethane; hexane, heptane and diethylether. Examples of inorganic blowing agents are air, carbon dioxide and nitrous oxide. The effect of a blowing agent may also be obtained by the addition of compounds which decompose at temperatures above room temperature with liberation of gas e.g. nitrogen. Azo compounds such as azodicarbonamide and azoisobutyric acid nitrile are examples of such compounds. Further examples of blowing agents and details concerning the use of blowing agents may be found in Kunststoff-Handbuch Volume VII, published by Vieweg and Hochtlen, Carl-Hanser-Verlag, Munich 1966, e.g. on pages 108 and 109, 453 to 455 and 507 to 510.

Catalysts suitable to the present invention are known to those in the art. Among the appropriate catalysts are tertiary amines such as triethylamine; tributylamine; N-methyl-morpholine; N-ethyl-morpholine; N,N,N',N'-tetramethylethylene-diamine; pentamethyl-diethylene-triamine and higher homologues (German Offenlegungsschriften Nos. 2,624,527 and 2,624,528); 1,4-diazabicyclo-(2,2,2)-octane; N-methyl-N'-dimethylaminoethylpiperazine; bis-(dimethylaminoalkyl)-piperazines (German Offenlegungsschrift No. 2,636,787); N,N-dimethylbenzylamine; N,N-dimethylcyclohexylamine; N,N-diethylbenzylamine; bis-(N,N-diethylaminoethyl)-adipate; N,N,N'-tetramethyl-1,3-butanediamine; N,N-dimethyl-β-phenylethylamine; 1,2-dimethylimidazole; 2-methylimidazole; monocyclic and bicyclic amidines (German Offenlegungsschrift No. 1,720,633); bis-(dialkylamino)-alkylethers, (U.S. Pat.

No. 3,330,782; German Auselegeschrift No. 1,030,558 and German Offenlegungsschriften Nos. 1,804,361 and 2,618,280); and tertiary amines having amide groups preferably formamide groups, (German Offenlegungsschriften Nos. 2,523,633 and 2,732,292). Known Mannich bases of secondary amines such as dimethylamine and aldehydes, (preferably formaldehyde), ketones (such as acetone, methyl ethyl ketones and cyclohexanone) and phenols (such as phenol, nonylphenol or bisphenol) may also be used as catalysts.

Examples of tertiary amines containing isocyanate reactive hydrogen atoms which may be used as catalysts include triethanolamine, triisopropanolamine, N-methyldiethanolamine, N-ethyl-diethanolamine, N,N-dimethylethanolamine, their reaction products with alkylene oxides such as propylene oxide and/or ethylene oxide, and secondary-tertiary amines (German Offenlegungsschrift No. 2,732,292).

Silaamines having carbon-silicon bonds, e.g. the compounds described in German Patent No. 1,229,290 (U.S. Pat. No. 3,620,984) may also be used as catalysts. 2,2,4-Trimethyl-2-silamorpholine and 1,3-diethylaminomethyl-tetraethyldisiloxane are examples of such catalysts.

Basic compounds containing nitrogen (such as tetraalkylammonium hydroxides), alkali metal hydroxides (such as sodium hydroxide), alkali metal phenolates (such as sodium phenolate) and alkali metal alcoholates (such as sodium methylate) may also be used as catalysts. Hexahydrotriazines are also suitable (German Offenlegungsschrift No. 1,769,043).

The reaction between isocyanate groups and Zerewitinoff-active hydrogen atoms may be accelerated by use of lactams and azalactams. This acceleration is believed to be attributable to formation of a complex between the lactam and the compound containing acidic hydrogen. Such complexes and their catalytic action are described in German Offenlegungsschriften Nos. 2,062,288; 2,062,289; 2,117,576 (U.S. Pat. No. 3,758,444); 2,129,198; 2,330,175 and 2,330,211.

Organic metal compounds particularly organic tin compounds may also be used as catalysts in the present invention. Suitable organic tin compounds (aside from compounds containing sulfur such as di-n-octyltin mercaptide (German Auslegeschrift No. 1,769,367; U.S. Pat. No. 3,645,927)) are the tin (II) salts of carboxylic acids, such as tin (II) acetate, tin (II) octoate, tin (II) ethylhexoate and tin (II) laurate; and tin (IV) compounds such as dibutyl tin oxide, dibutyl tin dichloride, dibutyl tin diacetate, dibutyl tin dilaurate, dibutyl tin maleate and dioctyl tin diacetate.

All of the above-mentioned catalysts may also be used as mixtures. Combinations of organic metal compounds and amidines, aminopyridines or hydrazinopyridines are also within the scope of the present invention (German Offenlegungschriften Nos. 2,434,185; 2,601,082 and 2,603,834). Other catalysts which may be used in the present invention and their mode of action are described in Kunststoff-Handbuch, Volume VII, published by Vieweg and Hochtlen, Carl-Hanser-Verlag, Munich 1966, e.g. on pages 96 to 102.

The catalysts may be used in a quantity of from about 0.001 to 10% by weight, based on the total quantity of compounds having at least two isocyanate reactive hydrogen atoms.

Surface active additives such as emulsifiers and foam stabilizers may also be used in the present invention. Suitable emulsifiers include the sodium salts of ricinoleic sulphonates; and salts of fatty acids with amines, such as oleic acid diethylamine or stearic acid diethanolamine. Alkali metal or ammonium salts of sulfonic acids (such as dodecylbenzene sulfonic acid or dinaphthylmethane disulfonic acid), fatty acids (such as ricinoleic acid) or of polymeric fatty acids may also be used as surface active additives.

The preferred foam stabilizers which may be used are polyether siloxanes, especially those which are water-soluble. These compounds generally have a polydimethylsiloxane group attached to a copolymer of ethylene oxide and propylene oxide. Such foam stabilizers have been described in U.S. Pat. Nos. 2,834,784; 2,917,480 and 3,629,308. Polysiloxane-polyoxyalkylene copolymers branched through allophanate groups (German Offenlegungsschrift No. 2,558,523) may also be used.

Reaction retarders which are suitable to the present invention include compounds which are acid in reaction such as hydrochloric acid or organic acid halides; known cell regulators such as paraffins or fatty alcohols or dimethylpolysiloxanes; pigments, dyes and known flame retarders such as tris-chloroethylphosphate, tricresyl phosphate, ammonium phosphate and polyphosphate; stabilizers against ageing and weathering; plasticizers; fungistatic and bacteriostatic substances; and fillers such as barium sulphate, kieselguhr, carbon black and whiting.

Additional examples of surface active additives, foam stabilizers, cell regulators, reaction retarders, stabilizers, flame retarding substances, plasticizers, dyes, fillers, and fungistatic and bacteriostatic substances which may be used according to the invention and details concerning their use and mode of action may be found in Kunststoff-Handbuch, Volume VII, published by Vieweg and Hochtlen, Carl-Hanser-Verlag, Munich 1966, e.g. on pages 103 to 113.

The process of the present invention may be carried out by reacting the starting materials in accordance with methods known to those in the art. Suitable processes include on-step, prepolymer and semi-prepolymer processes. Mechanical devices such as those described in U.S. Pat. No. 2,764,565 are suitable. Details concerning additional processing equipment which may be used in the present invention may be found in Kunststoff-Handbuch, Volume VII, published by Vieweg and Hochtlen, Carl-Hanser-Verlag, Munich, 1966, e.g. on pages 121 to 205.

In accordance with the present invention, foams may be produced by foaming inside closed molds. In this method, the reaction mixture is introduced into a mold made of a metal (e.g., aluminum) or a synthetic material (e.g., an epoxide resin). The reaction mixture then foams up inside the mold to form the molded product. This foaming may be carried out either to produce a molded product having a cellular structure on its surface or to produce a product having a compact skin and a cellular core. Foams may be made by either introducing just sufficient foamable reaction mixture into the mold to fill the mold with foam or introducing a larger quantity of foamable reaction mixture than is necessary for filling the interior of the mold with foam. The latter method is known as "overcharging", a procedure which is described in U.S. Pat. Nos. 3,178,490 and 3,182,104.

In the process according to the invention, the quantities of reactants should generally be chosen so that the equivalent ratio of polyisocyanates to the sum of compounds having isocyanate reactive groups is within the range of from 0.7:1 to 1.5:1 (depending upon the method of processing employed) and is preferably within the range of from 0.90:1 to 1.15:1. If the process is carried out by the prepolymer method, the percentage of isocyanate groups in the prepolymer may be from 1.8 to 6% by weight.

The molar ratio of reactive hydrogen of the chain lengthening agents to the reactive groups of the compound containing at least two isocyanate reactive hydrogen atoms and having a molecular weight from 400 to 10,000 may vary within wide limits but should preferably be within the range of from 0.4:1 to 1.5:1. In addition to the diamines containing sulfonamide groups used as chain lengthening agents in the present invention, a certain proportion of other chain lengthening agents (for example, other diamines or diols) may also be used. The molar fraction of the diamine containing a sulfonamide group chain lengthening agent should, however, lie within the range of 1 to 0.5, preferably 1 to 0.8.

The reaction between polyisocyanate (or isocyanate prepolymer) and the aromatic diamine containing a sulfonamide group should be preferably carried out within a temperature range of from 70° to 150° C.

The process according to the present invention may also be carried out by reacting the compound containing two reactive hydrogen atoms and having a molecular weight of from 400 to 10,000 with an excess of diisocyanate adding a chain lengthening agent and then pouring the mixture into molds. After several hours of heating, a high quality elastic polyurethane urea is produced.

According to another method, the compound containing two reactive hydrogen atoms and having a molecular weight of 400 to 10,000 may be mixed with the aromatic sulfonamide group containing diamine chain lengthening agent and reacted with an excess of diisocyanate. The reaction product is granulated and then shaped under heat and pressure. Polyurethanes with various degrees of hardness and elasticity can be obtained with this method by regulation of the proportions of reactants used. It is therefore possible to produce substances which can be treated like thermoplasts. In another variation of the process, a mixture of the relatively high molecular weight compound containing at least two isocyanate-reactive hydrogen atoms and the aromatic diamine containing a sulfonamide group chain lengthening agent may be reacted with a less than equivalent quantity of diisocyanate to produce a rollable sheet. Such a rollable sheet may subsequently be converted into a rubbery elastic polyurethane (e.g. by cross-linking with more diisocyanate).

The polyisocyanates may also be reacted with the aromatic diamines in a heterogeneous phase (see, e.g., German Auslegeschrift No. 1,122,699 or German Offenlegungsschrift No. 2,635,400). In that case, it is preferable that the diamines be used in the form of a powder having an average particle size of from 1 to 50 μm.

Elastomers produced according to the present invention have a wide variety of applications. Examples include shaped products subjected to severe mechanical stresses, such as tires, rollers and cone belts; seals which are subjected to severe thermal or chemical stresses; hot water pipes; motors; and the production of foils, textile coatings and polyurethane powders. Chain lengthening may also be accomplished in the presence of the blowing agents and additives mentioned above (preferably inside closed molds to form foams having a cellular core and dense surface).

The elastic and semielastic foams obtainable by the process according to the present invention may be used as cushion materials, mattresses and packaging material. Such foams may be produced either by the process of foaming inside molds or by manufacturing them from blocks of foam.

The following examples are given to illustrate the process of the present invention. The quantities are given as parts by weight or percentages by weight unless otherwise indicated.

EXAMPLES

The diamines containing sulfonamide groups used in the following examples were prepared in the following manner:

(A)
2,6-Diaminotoluene-4-(N,N-di-n-butyl-sulfonamide)

(i) 182 g of dry sodium salt of 2,6-dinitrotoluene-4-sulfonic acid, 225 ml of thionyl chloride and 5.1 ml of dimethylformamide were heated under reflux for 30 minutes. The thionyl chloride was then distilled off. Distillation residues were removed by passing a stream of nitrogen through the mixture, and pouring the residue into ice water. The sulfochloride precipitated was filtered off, washed several times with water and dried in a vacuum drying vessel at 50° C. A pale brown powder having a melting point of 126° to 128° C. was recovered in an amount which was 85% of the theoretical yield.

(ii) A solution of 12.9 g (0.1 mol) of dibutylamine and 11.1 g (0.11 mol) of triethylamine in 100 ml of dioxane were added to a suspension of 30.9 g (0.11 mol) of 2,6-dinitrotoluene-4-sulfochloride in 300 ml of dioxane at about 10° C. The reaction mixture was stirred for 2 hours at 50° C. The grey precipitate (triethylamine hydrochloride; m.p.: 253° to 255° C.) was then filtered off and washed with dioxane. The dioxane phases were evaporated to dryness on a rotary evaporator. A light brown powder having a melting point of 85°-87° C., was recovered in an amount which was 98% of the theoretical yield. This powder was then recrystallized from methanol. The purified product had a melting point of 94°-95° C. This product had the following

| Elementary analysis: | Calculated | Measured |
|---|---|---|
| C | 48.26 | 48.2 |
| H | 6.17 | 6.3 |
| N | 11.26 | 11.2 |
| O | 25.74 | — |
| S | 8.58 | — |

(iii) 329 g of the dinitro compounds were dissolved in 2 l of ethanol and hydrogenated under pressure in the presence of 60 g of Raney nickel. The Raney nickel was filtered off and the solution concentrated by evaporation under vacuum. The residue was dried in a vacuum drying vessel at 60° C. A greyish brown powder having a melting point of 121°-123° C. was recovered in an amount which was 96% of the theoretical yield.

The impurities in this powder were dissolved out by heating the product twice with a mixture of ethanol and water (1:1). A white powder having a melting point of 124° C. was recovered in an amount which was 73% of the theoretical yield. The purified powder had the following

| Elementary analysis: | Calculated | Measured |
|---|---|---|
| C | 57.51 | 57.6 |
| H | 8.63 | 8.8 |
| N | 13.42 | 13.4 |
| O | 10.22 | — |
| S | 10.22 | 10.2 |

The other 2,6-diaminotoluene-4-sulfonamides and 2,4-diaminobenzene-(N-phenyl-N-ethyl)-sulfonamides used in Examples 6 and 7 were prepared in a similar manner.

(B)
3,5-Diamino-4-chlorobenzene-(N,N-di-n-butyl)-sulfonamide 141 g of the dry potassium salt of 3,5-dinitro-4-chlorobenzene sulfonic acid were added to 250 ml of chlorosulfonic acid within 45 minutes at room temperature. The reaction mixture was then stirred for 1.5 hours at 100° C. The cooled reaction mixture was poured on about 3 l of ice water and the grey precipitate obtained was filtered off, washed several times with water and dried in a vacuum drying vessel at 50° C. A light grey powder having a melting point of 83°–85° C. was recovered in an amount which was 65% of the theoretical yield.

The resultant 3,5-dinitro-4-chlorobenzene sulfochloride was then further reacted by the procedure described above in A(ii) and A(iii).

(C) Piperazine-N,N'-bis-(3-aminophenylsulfonyl)

(i) 245 g (1.1 mol) of 3-nitrobenzene sulfonic acid chloride dissolved in 300 ml of acetone were added dropwise with stirring to
97 g (0.5 mol) of piperazine hexahydrate in
500 ml of 2.5N potassium hydroxide and
500 ml of water at room temperature (exothermic reaction).

The reaction mixture was then stirred for 2 hours at 50° C. The precipitated sulfonamide as suction filtered, washed with water and dried in a vacuum drying vessel at 50° C. 194 g (85% of the theoretical yield) of white powder (DC pure) having a melting point of 257°–259° C.

(ii) 200 g of the dinitro compound prepared in (i) were dissolved in 1500 ml of dimethylformamide and hydrogenated under pressure in the presence of 30 g of Raney nickel. The Raney nickel was removed by suction filtration after hydrogenation and the product was washed several times with DMF. The diamine obtained was precipitated by the addition of distilled water to the combined DMF solution. The diamine was then suction filtered, washed with water and dried in a vacuum drying vessel at 50° C. 157 g (93% of theoretical yield) of a white powder (DC pure) having a melting point of 293° C. were recovered. N,N'-Dimethyl-N,N'-bis-(3-aminophenylsulfonyl-ethylene diamine used in Examples 6 and 7 was prepared in similar manner.

(D) N-Hexyl-N,N-di-(3-aminophenyl)-sulfonamide

N-Hexyl-N,N-di-(3-nitrophenyl)-sulfonamide was prepared by the method taught by R. A. Bartsch et al, J. Chem. Eng. Data 22 (4), 1977, page 453 and then hydrogenated under pressure to the corresponding diamino compound in ethanol in the presence of Raney nickel. A brown solid having a melting point of approximately 40°–50° C. was recovered.

EXAMPLE 1

2000 g of a polyester obtained from adipic acid and ethylene glycol (molecular weight=2000; hydroxyl number=56) and 360 g of 2,4-diisocyanatotoluene were heated to 70° to 80° C. and maintained at this temperature until an isocyanate content of from 3.7 to 3.8% had been obtained. 500 g of the isocyanate prepolymer were briefly degasified in a water jet vacuum at 80° C. and then vigorously mixed with 65.5 g of molten 2,6-diaminotoluene-4-(N,N-di-n-butyl)-sulfonamide (m.p.=124° C.) within 30 seconds. The reaction mixture was poured into a mold heated to 100° C. and tempered for 24 hours at 110° C. after removal from the mold. The casting time of the mixture was from 1.5 to 2 minutes. The sample was ready for removal from the mold after about 5 minutes. The mechanical properties of the elastomer are given in Table 1 (see Example 3).

EXAMPLE 2

(Comparison experiment)

Example 1 was repeated with the exception that the 2,6-diaminotoluene-4-(N,N-di-n-butyl)-sulfonamide used in Example 1 was replaced by 55 g of 2,6-diaminotoluene-4-carboxylic acid-sobutyl ester. The resultant casting mixture could not be processed because of the rapid cross-linking reaction. The mixture swelled up into a jelly as the cross-linking agent was poured in.

EXAMPLE 3

(Comparison experiment)

Example 1 was repeated using 50 g of 3,5-diamino-4-chloro-benzoic acid isobutyl ester (which is exceptionally slow to react) instead of 2,6-diaminotoluene-4-(N,N-di-n-butyl)-sulfonamide. The pouring time of the reaction mixture was about 8 minutes and the product could be removed from the mold after an additional 10 minutes. After tempering for 24 hours at 110° C., an elastomer having the mechanical properties shown in Table 1 was obtained.

TABLE 1

| | Example 1 | Example 3 |
|---|---|---|
| Hardness (Shore A) DIN 53 505 | 82 | 87 |
| Tensile strength (mPa) DIN 53 504 | 60 | 65 |
| Elongation at break (%) DIN 53 504 | 680 | 680 |
| Load (mPa) | | |
| DIN 53 504 at 100% | 4.8 | 5.9 |
| at 300% | 8.3 | 9.5 |
| Elasticity (%) DIN 53 512 | 41 | 36 |
| Tear propagation resistance KN/m DIN 53 515 | 85 | 65 |

In spite of its low hardness, the elastomer produced according to the invention using 2,6-diaminotoluene-4-(N,N-di-n-butyl)-sulfonamide was found to have substantially improved tear propagation resistance.

EXAMPLE 4

2000 g of a linear polypropylene glycol ether (MWt=2000; hydroxyl number=56) were heated to 70°–80° C. together with 350 g of 2,4-diisocyanatotoluene. This mixture was maintained at this temperature until it had an isocyanate content of 3.6 to 3.7%.

500 g of the isocyanate prepolymer were briefly degasified at 80° C. and mixed within 30 seconds with 65 g of molten 2,6-diaminotoluene-4-(N,N-di-n-butyl)-sulfonamide. After a pouring time of 5 minutes, the sample could be removed after 20 minutes. After 24 hours of tempering at 110° C., an elastomer having the properties indicated in Table 2 was obtained.

EXAMPLE 5

(Comparison experiment)

Example 4 was repeated with the exception that the 2,6-diaminotoluene-4-(N,N-di-n-butyl)-sulfonamide was replaced with 55 g of 2,6-diaminotoluene-4-carboxylic acid isobutyl ester. The sample obtained had a pouring time of about 1 minute and after about 5 minutes could be removed from the mold. After tempering, the sample had the mechanical properties indicated in Table 2.

TABLE 2

|  | Example 4 | Example 5 |
|---|---|---|
| Hardness (Shore A) | 66 | 80 |
| Tensile strength (mPa) | 11.5 | 16.0 |
| Elongation at break (%) | 950 | 900 |
| Load (mPa) at 100% | 3.5 | 6.1 |
| 300% | 4.5 | 6.3 |
| Elasticity (%) | 58 | 64 |
| Tear propagation resistance (KN/m) | 75 | 80 |

The relatively long pouring time of the reaction mixture which had been cross-linked with 2,6-diaminotoluene-4-(N,N-di-n-butyl)-sulfonamide (Example 4) made it possible to process the mixture easily by the hand casting process. The 2,6-diaminotoluene-4-carboxylic acid isobutyl ester used in Example 5, on the other hand, reacted too rapidly to permit its use in the casting of complicated technical products. The molded parts obtained in both of these examples were not completely homogeneous. The elastomer obtained in Example 4, was considerably softer but it still had excellent tear propagation resistance.

EXAMPLE 6

200 g of the isocyanate prepolymer described in Example 1 (having an isocyanate content of 3.7%), were reacted as described in Example 1 with the diaminoarylsulfonamides indicated below. Where the pouring times and times required in the mold before removal of the product were determined, those times are indicated in Table 3. The hardness of the elastomer produced is also indicated. High melting diaminoarylsulfonamides were generally added to the isocyanate prepolymer in a finely divided form and worked up in a heterogeneous phase. The cross-linking temperature of from 80° to 100° C. was in most of these cases distinctly below the melting point of the sulfonamides. The following diaminoarylsulfonamides were used as cross-linking agents:

I. 2,6-Diaminotoluene-4-(N-methyl-N-octadecyl)-sulfonamide
II. 2,4-Diaminobenzene-(N-phenyl-N-ethyl)-sulfonamide
III. N,N′-Dimethyl-N,N′-bis-(3-aminophenylsulfonyl)ethylene diamine
IV. Piperazine-N,N′-bis-(3-aminophenylsulfonyl)

TABLE 3

| Cross-Linking Agent | M.P. (°C.) | Quantity (g) | Pouring time (min) | Time before removal from the mold (min) | Hardness (Shore A) |
|---|---|---|---|---|---|
| I | 79 | 42 | 2.5 | 5 | 65 |
| II | 125 | 26.2 | 3.5 | 10 | 50 |
| III | 145 | 35.8 | 15 | 30 | 50 |
| IV | 280 | 35.6 | — | 2 hours | 65 |

EXAMPLE 7

Example 1 was repeated using 200 g of the isocyanate prepolymer mentioned in Example 5 (which is based on a polypropylene glycol ether) in place of the adipic acid polyester prepolymer of Example 1. The elastomers obtained when using the diaminoarylsulfonic acid amides indicated below have the Shore A hardnesses shown in Table 4. The cross-linking agents are identified in Table 4 as follows:

(I) 2,6-Diaminotoluene-4-(N-methyl-N-octadecyl)-sulfonamide
(II) N,N′-Dimethyl-N,N′-bis-(3-aminophenylsulfonyl)-ethylene diamine
(III) Piperazine-N,N′-bis-(3-aminophenylsulfonyl)
(IV) 2,6-Diaminotoluene-4-(N,N-di-isobutyl)-sulfonamide
(V) 2,6-Diaminochlorobenzene-4-(N,N-di-n-butyl)-sulfonamide
(VI) N-Hexyl-N,N-di-(3-aminophenyl)-sulfonamide

TABLE 4

| Cross-linking agent | M.P. (°C.) | Quantity (g) | Pouring time (min) | Time before removal from the mold | Hardness (Shore A) |
|---|---|---|---|---|---|
| I | 79 | 42 | 30 | >1 hr. | 35 |
| II | 145 | 35.8 | 30 | — | 25 |
| III | 280 | 35.6 | — | >2 hrs. | 30 |
| IV | 155 | 24 | 30 | ~1 hr. | 70 |
| V | 158 | 25.2 | 25 | 45 min. | 40 |
| VI | 50 | 31.0 | — | >2 hrs. | 20 |

What is claimed is:

1. A process for the production of a polyurethane urea elastomer by reacting
(a) a polyisocyanate,
(b) a compound containing at least two isocyanate reactive hydrogen atoms and having a molecular weight of from 400 to 10,000, and
(c) an aromatic diamine corresponding to the formula

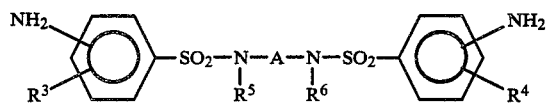

in which $R^3$ and $R^4$ (which may be the same or different) represent hydrogen, a straight or branched chain alkyl group having from 1 to 6 carbon atoms, an alkoxy group having from 1 to 6 carbon atoms, or a halogen atom; and $R^5$, $R^6$ and A together represent a piperazine ring in which the diamine (c) is used in a quantity such that the diamine (c) represents a mole fraction within the range of 1 to 0.5 of chain lengthening agent employed.

2. The process of claim 1 in which the materials reacted further include an isocyanate reactive compound having a molecular weight of from 32 to 400.

3. The process of claim 1 in which the materials reacted further include a compound taken from the group consisting of activators, blowing agents, auxiliary agents and additives, and mixtures thereof.

4. The process of claim 1 in which the aromatic diamine (c) is added in the liquid or molten state to an isocyanate prepolymer of components (a) and (b).

5. The process of claim 1 in which the aromatic diamine (c) is in the liquid or molten state and together with component (b) is added to component (a).

6. A process for the production of a polyurethane urea elastomer by reacting
(a) a polyisocyanate,
(b) a compound containing at least two isocyanate reactive hydrogen atoms and having a molecular weight of from 400 to 10,000, and
(c) an aromatic diamine corresponding to the formula

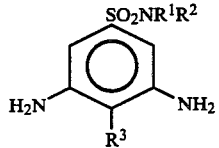

in which
$R^1$ and $R^2$ (which may be the same or different) represent hydrogen, a straight or branched chain alkyl group having from 1 to 20 carbon atoms, or an aryl or aralkyl group having from 6 to 20 carbon atoms and
$R^3$ represents chlorine or a methyl group in which the diamine (c) is used in a quantity such that the diamine (c) represents a mole fraction within the range of 1 to 0.5 of chain lengthening agent employed.

7. The process of claim 6 in which the materials reacted further include an isocyanate reactive compound having a molecular weight of from 32 to 400.

8. The process of claim 6 in which the materials reacted further include a compound taken from the group consisting of activators, blowing agents, auxiliary agents and additives, and mixtures thereof.

9. The process of claim 6 in which the aromatic diamine (c) is added in the liquid or molten state to an isocyanate prepolymer of components (a) and (b).

10. The process of claim 6 in which the aromatic diamine (c) is in the liquid or molten state and together with component (b) is added to component (a).

11. A process for the production of a polyurethane urea elastomer by reacting
(a) a polyisocyanate,
(b) a compound containing at least two isocyanate reactive hydrogen atoms and having a molecular weight of from 400 to 10,000, and
(c) a mononuclear or dinuclear aromatic diamine in which at least one sulfonamide group is a substituent on at least one aromatic ring wherein the group of compounds which may be used as component
(c) does not include compounds represented by the formula

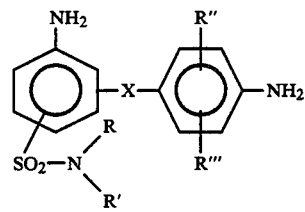

in which
X represents

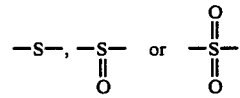

R and R' (which may be the same or different) represent straight or branched chain aliphatic groups having from 1 to 4 carbon atoms, and R" and R''' (which may be the same or different) represent hydrogen, an alkyl, an alkoxy or an alkylmercapto group having from 1 to 4 carbon atoms in which the diamine (c) is used in a quantity such that the diamine (c) represents a mole fraction within the range of 1 to 0.5 of chain lengthening agent employed and in which the polyisocyanate (a) is reacted in a heterogeneous phase with a suspension of the diamine (c) in component (b) at temperatures above or below the melting point of diamine (c).

12. The process of claim 11 in which the diamine (c) is suspended in component (b) and an isocyanate reactive compound having a molecular weight of from 32 to 400.

13. The process of claim 11 in which the aromatic diamine is a powder having an average particle size of from 1 to 50 μm.

* * * * *